United States Patent Office 3,639,400
Patented Feb. 1, 1972

3,639,400
3-CARBOXYLIC ACID-AMIDO-QUINOXALINE-DI-N-OXIDES-(1,4) AND THEIR PRODUCTION
Roland Nast, Cologne-Buchheim, Kurt Ley, Odenthal-Globusch, Ulrich Eholzer, Cologne-Stammheim, Karl-Georg Metzger, Wuppertal-Elberfeld, and Dieter Fritsche, Cologne-Lindenthal, Germany, assignors to Farbenfabriken Bayer Aktiengesellschaft, Leverkusen, Germany
No Drawing. Filed Aug. 25, 1969, Ser. No. 852,917
Claims priority, application Germany, Aug. 30, 1968,
P 17 95 264.6
Int. Cl. C07d *51/78*
U.S. Cl. 260—250                             8 Claims

ABSTRACT OF THE DISCLOSURE 3-carboxylic acid-amido-quinoxaline-di-N-oxides-(1,4) of the formula:

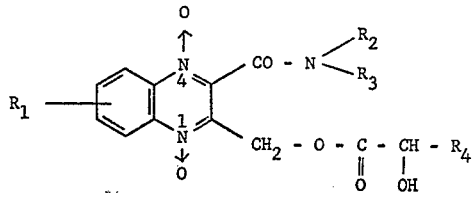

wherein:
$R_1$ is hydrogen, lower alkyl, lower alkoxy, hydroxy or an acyloxy moiety of a lower aliphatic carboxylic acid and wherein $R_1$ is from 1 to 5 such moieties,
$R_2$ is hydrogen, an aliphatic moiety or an aliphatic moiety substituted by hydroxy, lower alkoxy, carbalkoxy, monoalkylamino or dialkylamino,
$R_3$ is hydrogen, an aliphatic moiety or an aliphatic moiety substituted by hydroxy, lower alkoxy, carbalkoxy, monoalkylamino or dialkylamino, or $R_2$ and $R_3$ are each lower alkyl linked together with the amide nitrogen to form a 5-, 6- or 7-membered heterocyclic ring or $R_2$ and $R_3$ are each lower alkyl linked together with an amide nitrogen to form a 5-, 6- or 7-membered heterocyclic ring having N or O as a second heteroatom, and
$R_4$ is hydrogen, lower alkyl or substituted or unsubstituted phenyl, are useful for their antibacterial activity.

The present invention is concerned with 3-carboxylic acid-amido-quinoxaline-di-N-oxides-(1,4), processes for their production, antibacterial compositions containing such compounds and methods of treatment of bacterial infections utilizing such compounds. More particularly, the 3-carboxylic acid-amido-quinoxaline-di-N-oxides-(1,4) of the present invention are represented by the formula:

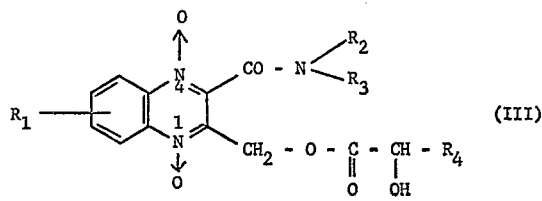
(III)

wherein:
$R_1$ is hydrogen, lower alkyl, lower alkoxy, hydroxy or an acyloxy moiety of a lower aliphatic carboxylic acid and wherein $R_1$ is from 1 to 5 such moieties,
$R_2$ is hydrogen, an aliphatic moiety or an aliphatic moiety substituted by hydroxy, lower alkoxy, carbalkoxy, monoalkylamino or dialkylamino,
$R_3$ is hydrogen, an aliphatic moiety or an aliphatic moiety substituted by hydroxy, lower alkoxy, carbalkoxy, monoalkylamino or dialkylamino, or $R_2$ and $R_3$ are each lower alkyl linked together with the amide nitrogen to form a 5-, 6- or 7-membered heterocyclic ring or $R_2$ and $R_3$ are each lower alkyl linked together with an amide nitrogen to form a 5-, 6- or 7-membered heterocyclic ring having N or O as a second heteroatom, and
$R_4$ is hydrogen, lower alkyl or substituted or unsubstituted phenyl.

In a preferred embodiment of the present invention $R_1$ is hydrogen, lower alkyl of 1 to 4 carbon atoms, lower alkoxy of 1 to 4 carbon atoms or chlorine, $R_2$ and $R_3$ are the same or different and are hydrogen, straight or branched chain alkyl of 1 to 12 carbon atoms, cycloalkyl of 5 to 7 carbon atoms, straight or branched chain alkyl of 1 to 12 carbon atoms substituted by hydroxy, lower alkoxy of 1 to 4 carbon atoms, carbalkoxy of 1 to 4 carbon atoms in the alkyl moiety, monoalkylamino of 1 to 4 carbon atoms in the alkyl moiety or dialkylamino of 1 to 4 carbon atoms in each alkyl moiety or $R_2$ and $R_3$ are each lower alkyl linked together to form a 5-, 6- or 7-membered heterocyclic ring with the amide nitrogen which ring may have N or O as a second heteroatom and if N is the second heteroatom, it is preferably in the paraposition to the amide nitrogen, and $R_4$ is hydrogen, lower alkyl of 1 to 4 carbon atoms or phenyl. In a further preferred embodiment of the present invention the alkyl moieties of $R_2$ and $R_3$ and the substituted alkyl moieties of $R_2$ and $R_3$ have 1 to 6 carbon atoms.

A particularly valuable group of compounds are those of the Formula III above, wherein $R_1$ is hydrogen, $R_2$ and $R_3$ are the same or different and are hydrogen, straight or branched chain lower alkyl of 1 to 6 carbon atoms, cycloalkyl of 5 to 7 carbon atoms, straight or branched chain lower alkyl of 1 to 6 carbon atoms substituted by hydroxy or lower alkoxy of 1 to 4 carbon atoms or $R_2$ and $R_3$ are each lower alkyl linked together to form a 5- or 6-membered heterocyclic ring with the amide nitrogen which ring may have O as a second heteroatom, and $R_4$ is hydrogen, lower alkyl of 1 to 4 carbon atoms or phenyl.

The compounds of Formula III are valuable for their antibacterial activity. These compounds are produced by reacting in an organic solvent, optionally in the presence of water, at a temperature range of about 10° C. to 160° C. a 2-halomethyl-3-carboxylic acid-amido-quinoxaline-di-N-oxide-(1,4) of the formula:

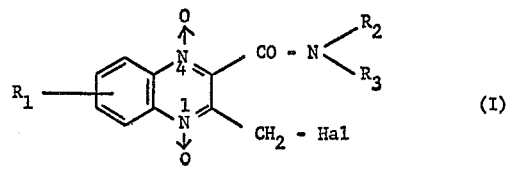
(I)

wherein $R_1$, $R_2$ and $R_3$ are as above defined and Hal is chlorine or bromine, with a salt of a α-hydroxy-carboxylic acid of the formula:

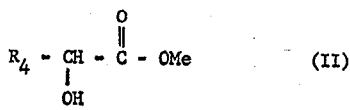

(II)

wherein $R_4$ is as above defined and Me is sodium, potassium or ammonium.

While $R_1$ is preferably hydrogen or one or two alkyl or alkoxy moieties, preferably of 1 to 4 carbon atoms, hydroxy, halogen (preferably chlorine) or the acyloxy moiety of a lower aliphatic carboxylic acid, $R_1$ may be three, four or five such moieties.

When 2 - chloromethyl - 3 - methyl-carboxylic acid-amido - quinoxaline - di - N - oxide - (1,4) and the triethyl ammonium salt of mandelic acid are used as starting substances, the course of the reaction can be illustrated by the following equation:

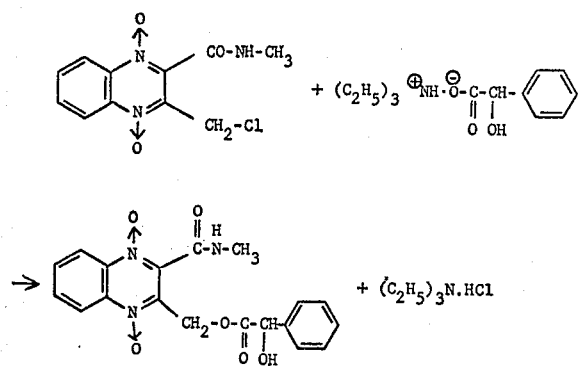

Specific examples of the 2 - halomethyl-3-carboxylic acid-amido quinoxaline-di-N-oxides-(1,4) useful as starting materials for the production of the compounds of the present invention are the following:

2-chloromethyl-3-methylcarboxylic acid-amido-quinoxaline-di-N-oxide-(1,4),
2-chloromethyl-3-butyl-carboxylic acid-amido-quinoxaline-di-N-oxide(1,4),
2-chloromethyl-3-(β-methoxy-ethyl-carboxylic- acid-amido-quinoxaline)-quinoxaline-di-N-oxide-1,4),
2-chloromethyl-3-dimethyl-carboxylic acid-amido-quinoxaline-di-N-oxide-(1,4),
2-chloromethyl-3-(β-acetoxy-ethyl-carboxylic acid-amido)-quinoxaline-di-N-oxide-(1,4),
2-chloromethyl-3-cyclohexyl-carboxylic acid-amido-quinoxaline-di-N-oxide-(1,4),
2-bromomethyl-3-pyrrolidyl-carboxylic acid-quinoxaline-di-N-oxide-(1,4),
2-chloromethyl-3-carboxylic acid-amido-quinoxaline-di-N-oxide-(1,4),
2-chloromethyl-3-methyl-carboxylic acid-amido-7-methyl-quinoline-di-N-oxide-(1,4),
2-chloromethyl-3-methyl-carboxylic acid-amido-7-methoxy-quinoxaline-di-N-oxide-(1,4),
2-chloromethyl-3-methylcarboxylic acid-amido-7-ethoxy quinoxaline-di-N-oxide-(1,4),
2-chloromethyl-3-methyl-carboxylic acid-amido-7-chloro-quinoxaline-di-N-oxide-(1,4),
2-chloromethyl-3-piperazinyl-carboxylic acid-quinoxaline-di-N-oxide-(1,4).

Specific examples of α-hydroxy-carboxylic acids used for the production of the compounds of the present invention are the following: lactic acid, hydroxy-acetic acid and mandelic acid.

For each mol 2-halomethyl-3-carboxylic acid-amido-quinoxaline-di-N-oxide-(1,4) there are used one to two mols of a salt of the aforementioned α-hydroxy-carboxylic acids in solid form or dissolved in water, or one to two mols α-hydroxy-carboxylic acid and one to two mols triethylamine. Suitable diluents are water-miscible organic solvents, lower alcohols, preferably ethanol, acetonitrile, dimethyl formamide, dimethyl sulphoxide or dioxan. A preferred embodiment of the process according to the invention comprises suspending or dissolving one mol of a 2-halomethyl-3-carboxylic acid-quinoxaline-di-N-oxide-(1,4) in one of the aforementioned organic diluents, and adding one to two mols α-hydroxy-carboxylic acid and at least 1 mol triethylamine.

While the reactions are carried our within a temperature range of about 10° to about 160° C., the preferred range is from about 40° to about 100° C.

The 3 - carboxylic acid-amido-quinoxaline-di-N-oxides-(1,4) of the Formula III according to the invention, are crystalline, colorless or pale yellow to flesh-colored substances. In general, they separate in crystalline form upon cooling of the reaction mixture and can be isolated in a usual manner and purified, if necessary.

As discussed above, the compounds of the present invention exhibit antibacterial activity and have been tested in animals by both oral and subcutaneous administration against acute bacterial infections. They have also been tested for in vitro proof activity. Very good antibacterial activity has been exhibited both in vitro and in vivo. The compounds of the present invention exhibit activity against gram-negative as well as gram-positive bacteria and are suitable for oral administration as well as parenteral administration.

While is has been generally found that the compounds of the present invention should be administered in the range of from about 25 mg./kg. to about 150 mg./kg. per day, it may in some cases be necessary and advisable to deviate from these ranges as appropriate in connection with a variety of factors which have to be taken into consideration including the species of animals, the particular patient involved, past medical history, prior treatment, severity of the infection and the like as well as of course the time and interval over which administration will occur. Thus, it may be possible to administer less than the above indicated amount, while in other cases it may be necessary to administer more than the upper limit indicated. If greater amounts are administered, it may be advisable to distribute them in several individual doses administered over the course of the day.

The compounds of the present invention may be administered per se or in combination with pharmaceutically acceptable inert carriers or diluents. Suitable forms of application in combination with various inert carriers are the following: tablets, capsules, powders, sprays, aqueous suspensions, injectable solutions, elixirs, syrups and the like. Such carriers comprise solid diluents or fillers, a sterile aqueous medium as well as various non-toxic organic solvents and the like. Tablets and the like intended for oral use may, of course, be provided with sweetening additives and similar substances. In the aforesaid case, the therapeutically active compounds should be present at a concentration of about 0.5 to 90 percent by weight of the total mixture, i.e. in quantities which are sufficient to achieve the range of dosage mentioned above.

In the case of oral administration, the tablets can obviously also contain additives, such as sodium citrate, calcium carbonate and dicalcium phosphate together with various other additives, such as starch, preferably potato starch and the like, and binding agents, such as polyvinylpyrrolidone, gelatin and the like. Lubricants, such as magnesium stearate, sodium lauryl sulphate and talc may also be used concurrently for the production of the tablets. In the case of aqueous suspensions and/or elixirs, which are intended for oral use, the active substance may be provided with various agents improving the flavor, coloring substances, emulsifiers and/or together with diluents, such as water, ethanol, propylene glycol, glycerol and similar compounds or combinations.

In the case of parenteral application, solutions of the active substances in sesame or peanut oil, or in aqueous propylene glycol or N,N-dimethyl formamide can be employed as well as sterile aqueous solutions in the case of water-soluble compounds.

Aqueous solutions of this kind should be buffered in a usual manner if necessary; furthermore, the liquid diluent should be rendered isotonic from the start by the addition of the necessary amount of salt or glucose. Such aqueous solutions are particularly suitable for intravenous, intramuscular and intraperitoneal injections.

Sterile aqueous media of this kind are prepared in a known manner.

The effectiveness of representative compounds of the present invention can be seen from the compilation below; the numbers of the tested compounds correspond to the numbers of the subsequent examples. In the animal tests with white mice the intraperitoneally infected animals were treated subcutaneously or orally as follows:

(1) Dose given once (s.c. or p.o.) of 1000 mg., 500 mg., 200 mg., 100 mg., 50 mg. 25 mg., 12.5 mg. or 6.25 mg./kg., 15 minutes before or 90 minutes after infection.

(2) Dose given twice (or three-times) of 6.25 mg., 12.5 mg., 25 mg., 50 mg. or 150 mg./kg. two hours before and 5 hours after infection.

(3) Dose given four times of 50 mg. or 150 mg./kg. two hours before infection, shortly after infection, 3 hours, 5 hours and (or) 21 hours and 29 hours after infection.

*E. coli, Klebsiella, Staphylococcus aureus, Diplococcus pneumoniae* or *Streptococcus pyogenes, Proteus mirabilis* and *Pseudomonas aeruginosa* were used as infection germs.

The $ED_{100}$ of the compounds most effective against *E. coli* C 165 (e.g. substance 1 and 4) ranges from 5 mg./kg. to 100 mg./kg. when given once orally or subcutaneously.

The $LD_{50}$ lies within the dosage range of about 400 mg./kg. to about 1500 mg./kg. after oral administration once to mice. The substances are thus relatively non-toxic, since the relatively less well tolerated substances are characterized by higher effectiveness and are therefore used in lower dosage. The substances were also well tolerated in the treatment of rats when orally treated with 60 mg./kg. twice daily over two weeks.

In the case of acute ascending urinary infections of rats (Pyelonephritides) dosages of 2×15 mg./kg. daily over 7 to 10 days were applied with good results and well tolerated.

The substances have a bacteriostatic and bacteriocidal action in vitro. They are also effective against mycoplasms within a dosage range of 5–30 γ/ml.

It can be seen from the table following that the bacteriocidal or bacteriostatic action of the compounds described above reaches a wide spectrum of the bacteria species which are of importance in veterinary medicine. The action relates to gram-negative and gram-positive bacteria. The compounds can be applied orally or intramuscularly against general infections in domestic animals, e.g. pigs, cattle, fowl, but also intracisternally against infections of a local type, e.g. mastitis in cattle. In the dosage range of 5 mg./kg.–100 mg./kg. they result in high level values in serum and urine of pigs, cattle and dogs. Dependent upon dosage, the serum level values range from 5 $\mu$g./ml. to 100 $\mu$g./ml. After oral or intramuscular application, the urine level values reach in pigs more than 500 $\mu$g./ml. urine, dependent upon the concentration of the dose. The compounds can also be used as feed-additives when raising young or fattened cattle or fowl.

INHIBITION VALUES IN VITRO

| | Minimum inhibition concentration as $\mu$g./ml. nutrient medium | | | |
|---|---|---|---|---|
| Bacterium | Compound (Example 1) | Compound (Example 4) | Compound (Example 3) | Compound (Example 2) |
| (a) | 10 | 6–25 | 3–50 | 50–100 |
| (b) | 5 | 12–50 | 25–50 | 10 |
| (c) | 100–200 | 100 | 50–100 | 100 |
| (d) | 100 | 25 | 12–25 | 10 |
| (h) | 5 | 25–100 | 25–100 | 50–100 |
| (i) | 10 | 25–100 | 25 | 50–100 |
| (j) | | 25 | 12 | |
| (e) | | 12–100 | 12–100 | |
| (f) | | 12 | 12 | |
| (g) | | 6 | 6 | |
| (k) | 5–30 | 5–30 | 5–30 | 5–30 |
| (l) | 12 | 12 | 25 | 50 |
| (m) | 25 | 12 | 12 | 12 |
| (n) | 100 | 25–100 | | 100 |
| (o) | 100 | 25–100 | | 100 |
| (p) | 50–100 | 50–100 | | 50–100 |

(a) = *E. coli sp.*; (b) = *Proteus sp.*; (c) = *Pseudomonas aeruginosa sp.*; (d) = *Klebsiella sp.*; (e) = *Salm. typh.*; (f) = *Coryneb.dipht.*; (g) = *Neiss. cat.*; (h) = *Staphylococcus aureus sp.*; (i) = *Streptococcus pyogenes w*; (j) = *Pneumococcus sp.*; (k) = *Mycoplasma gallis.*; (l) = *Corynebacterium pyogenes* (plate test on oxide nutrient agar); (m) = *Streptococcus agalactiae* (plate test on oxide-S-agar); (n) = *Hämophilus suis* (plate test on nutrient agar with blood addition); (o) = *Brucella suis* (plate test on blood agar); (p) = *Enterococcus faecalis*.

ANIMAL TESTS ON WHITE MICE

| Compound example | Dose (mg./kg.) oral | Infection germ | Percent surviving animals 24 hours after infection |
|---|---|---|---|
| 1 | 1×200 | Streptococcus pyogenes w | 100 |
| | 1×200 | Staphylococcus aureus 133 | 100 |
| | 1×100 | Pseudomonas aeruginosa w | 100 |
| 4 | 1×10 | Escherichia coli C 165 | 100 |
| | 1×75 | Staphylococcus aureus 133 | 100 |
| | 1×150 | Pseudomonas aeruginosa w | 100 |
| 3 | 1×10 | Escherichia coli C 165 | 100 |
| | 1×75 | Staphylococcus aureus 133 | 100 |
| | 1×50 | Pseudomonas aerug w | 90 |
| 2 | 1×10 | E. coli C 165 | 100 |
| | 1×25 | Staph. aureus 133 | 100 |
| | 1×50 | Streptoc. pyogenes w | 90 |

Ascending urinary infection with *Proteus mirabilis* in rats: No pyelonephritides were observed after treatment with compound (4) given orally over 7 days with 2×15 mg./kg. 100% of the animals of the control group were diseased.

EXAMPLE 1

53.4 g. (0.2 mol) 2-chloromethyl-3-methyl-carboxamido-quinoxaline-di-N-oxide-(1,4) are suspended in 60 cc. dimethyl formamide; 36.4 g. (0.24 mol) α,1-mandelic acid and 22.2 g. (0.22 mol) triethylamine are added and the mixture is stirred at 60° C. for 5 hours. After about 2 hours, the quinoxaline-di-N-oxide goes into solution, and the triethylamine hydrochloride is precipitated.

When the reaction is completed, the mixture is cooled, the triethylamine hydrochloride filtered off with suction and the filtrate concentrated at 60° C. in a vacuum (12 mm. Hg). By stirring the yellow-brown oily residue with 300 cc. methanol, yellow crystals are formed which are filtered off with suction and washed with methanol and water. There are obtained 55 g. (72% of theory) 2-(α-phenyl-α-hydroxy-acetoxymethyl) - 3 - methyl - carboxamido-quinoxaline-di-N-oxide-(1,4) in the form of yellow crystals which, after redissolving from ethanol, melt at

*Analysis.*—Calculated for $C_{19}H_{17}N_3O_6$ (mol. weight 383), (percent): C, 59.6; H, 4.4; N, 11.0. Found (percent): C, 59.6; H, 4.7; N, 11.0.

In an analogous manner to that described above, the following compounds are obtained which have in the 3-position the following moieties, the quinoxaline-di-N-oxide-(1,4) starting material containing the moiety indicated adjacent thereto:

TABLE

| 3-position moiety final product | 3-position moiety starting material |
| --- | --- |
| Carboxamido | Carboxamido. |
| Ethyl-carboxamido | Ethyl-carboxamido. |
| Propyl-carboxamido | Propyl-carboxamido. |
| Isopropyl-carboxamido | Isopropyl-carboxamido. |
| Cyclohexyl-carboxamido | Cyclohexyl-carboxamido. |
| ($\beta$-hydroxy-ethyl)-carboxamido | ($\beta$-hydroxy-ethyl)-carboxamido. |
| ($\beta$-methoxy-ethyl)-carboxamido | ($\beta$-methoxy-ethyl)-carboxamido. |
| Dimethyl-carboxamido | Dimethyl-carboxamido. |
| Diethyl-carboxamido | Diethyl-carboxamido. |
| Pyrrolidyl-carboxylic acid | Pyrrolidyl-carboxylic acid. |
| Piperidinyl-carboxylic acid | Piperidinyl-carboxylic acid. |
| Morpholinyl-carboxylic acid | Morpholinyl-carboxylic acid. |

EXAMPLE 2

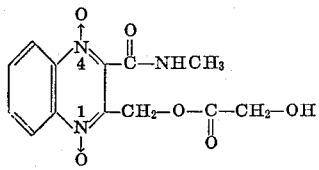

Melting point 145° C.–146° C. Appearance: pale yellow crystals.

This compound was produced in a manner analogous to that described in Example 1, by using as a starting material hydroxy acetic acid in place of the $\alpha$,1-mandelic acid.

EXAMPLE 3

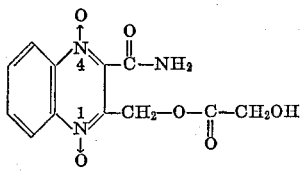

Melting point 193° C. Appearance: pale yellow crystals.

This compound was produced in a manner analogous to that described in Example 1, by using as starting materials 2 - chloromethyl-3-carboxamido-quinoxaline-di-N-oxide-(1,4) and hydroxy acetic acid.

In a manner analogous to the processes described with reference to Examples 2 and 3, the following compounds were produced containing the following moieties in the 3-position wherein the acid used was hydroxy acetic acid and the moiety in the 3-position of the starting material is as indicated below:

| 3-position moiety final product | 3-position moiety starting material |
| --- | --- |
| Ethyl-carboxamido | Ethyl-carboxamido. |
| Propyl-carboxamido | Propyl-carboxamido. |
| Isopropyl-carboxamido | Isopropyl-carboxamido. |
| Cyclohexyl-carboxamido | Cyclohexyl-carboxamido. |
| ($\beta$-hydroxy-ethyl)-carboxamido | ($\beta$-hydroxy-ethyl)-carboxamido. |
| ($\beta$-methoxy-ethyl)-carboxamido | ($\beta$-methoxy-ethyl)-carboxamido. |
| Dimethyl-carboxamido | Dimethyl-carboxamido. |
| Diethyl-carboxamido | Diethyl-carboxamido. |
| Pyrrolidyl-carboxylic acid | Pyrrolidyl-carboxylic acid. |
| Piperidinyl-carboxylic acid | Piperidinyl-carboxylic acid. |
| Morpholinyl-carboxylic acid | Morpholinyl-carboxylic acid. |

EXAMPLE 4

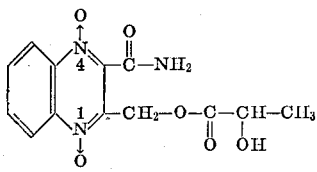

Melting point 178° C. Appearance: pale yellow crystals.

This compound was produced in a manner analogous to that described in Example 1, wherein the starting materials were 2-chloromethyl-3-carboxamido-quinoxaline-di-N-oxide-(1,4) and lactetic acid.

In a manner analogous to that described in Example 4, the following compounds were produced containing the following moieties in the 3-position wherein the acid used was lactic acid and the moiety in the 3-position of the starting material is as indicated below:

| 3-position moiety final product | 3-position moiety starting material |
| --- | --- |
| Methyl-carboxamido | Methyl-carboxamido. |
| Propyl-carboxamido | Propyl-carboxamido. |
| Isopropyl-carboxamido | Isopropyl-carboxamido. |
| Cyclohexyl-carboxamido | Cyclohexyl-carboxamido. |
| ($\beta$-hydroxy-ethyl)-carboxamido | ($\beta$-hydroxy-ethyl)-carboxamido. |
| ($\beta$-methoxy-ethyl)-carboxamido | ($\beta$-methoxy-ethyl)-carboxamido. |
| Dimethyl-carboxamido | Dimethyl-carboxamido. |
| Diethyl-carboxamido | Diethyl-carboxamido. |
| Pyrrolidyl-carboxylic acid | Pyrrolidyl-carboxylic acid. |
| Piperidinyl-carboxylic acid | Piperindinyl-carboxylic acid. |
| Morpholinyl-carboxylic acid | Morpholinyl-carboxylic acid. |

What is claimed is:

1. 3 - carboxylic acid-amido-quinoxaline-di-N-oxides-(1,4) of the formula:

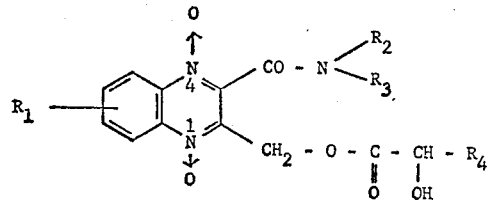

wherein $R_1$ is hydrogen, lower alkyl of 1 to 4 carbon atoms, lower alkoxy of 1 to 4 carbon atoms, chlorine or two such moieties, $R_2$ is hydrogen, straight or branched chain alkyl of 1 to 12 carbon atoms, cycloalkyl of 5 to 7 carbon atoms, straight or branched chain alkyl of 1 to 12 carbon atoms substituted by hydroxy, lower alkoxy of 1 to 4 carbon atoms, carbalkoxy of 1 to 4 carbon atoms in the alkyl moiety, monoalkylamino of 1 to 4 carbon atoms in the alkyl moiety or dialkylamino of 1 to 4 carbon atoms in each alkyl moiety, $R_3$ is hydrogen, straight or branched chain alkyl of 1 to 12 carbon atoms, cycloalkyl of 5 to 7 carbon atoms, straight or branched chain alkyl of 1 to 12 carbon atoms substituted by hydroxy, lower alkoxy of 1 to 4 carbon atoms, carbalkoxy of 1 to 4 carbon atoms in the alkyl moiety, monoalkylamino of 1 to 4 carbon atoms in the alkyl moiety or dialkylamino of 1 to 4 carbon atoms in each alkyl moiety, or $R_2$ and $R_3$ are each lower alkyl linked together to form a 5- or 6-membered heterocyclic ring with the nitrogen or $R_2$ and $R_3$ are each lower alkyl linked together to form a 5- or 6-membered heterocyclic ring with the amide nitrogen which ring has N or O as a second heteroatom, and $R_4$ is hydrogen, lower alkyl of 1 to 4 carbon atoms or phenyl.

2. A compound according to claim 1, wherein $R_1$ is hydrogen, lower alkyl of 1 to 4 carbon atoms, lower alkoxy of 1 to 4 carbon atoms, chlorine or two such moieties, $R_2$ is hydrogen, straight or branched chain alkyl of 1 to 6 carbon atoms, cycloalkyl of 5 to 7 carbon atoms, straight or branched chain alkyl of 1 to 6 carbon atoms substituted by hydroxy, lower alkoxy of 1 to 4 carbon atoms, carbalkoxy of 1 to 4 carbon atoms in the alkyl moiety, monoalkylamino of 1 to 4 carbon atoms in the alkyl moiety or dialkylamino of 1 to 4 carbon atoms in each alkyl moiety, $R_3$ is hydrogen, straight or branched chain alkyl of 1 to 6 carbon atoms, cycloalkyl of 5 to 7 carbon atoms, straight or branched chain alkyl of 1 to 6 carbon atoms substituted by hydroxy, lower alkoxy of 1 to 4 carbon atoms, carbalkoxy of 1 to 4 carbon atoms in the alkyl moiety, monoalkylamino of 1 to 4 carbon atoms in the alkyl moiety or dialkylamino of 1 to 4 carbon atoms in each alkyl moiety, or R₂ and R₃ are each lower alkyl linked together to form a 5-, 6- or 7-membered heterocyclic ring with the nitrogen or R₂ and R₃ are each lower alkyl linked together to form a 5-, 6- or 7-membered heterocyclic ring with the amide nitrogen which ring has N or O as a second heteroatom, and R₄ is hydrogen, lower alkyl of 1 to 4 carbon atoms or phenyl.

3. The compound according to claim 1, wherein
R₁ is hydrogen,
R₂ is hydrogen, straight or branched chain lower alkyl of 1 to 6 carbon atoms, cycloalkyl of 5 to 7 carbon atoms, straight or branched chain lower alkyl of 1 to 6 carbon atoms substituted by hydroxy, or lower alkoxy of 1 to 4 carbon atoms,
R₃ is hydrogen, straight or branched chain lower alkyl of 1 to 6 carbon atoms, cycloalkyl of 5 to 7 carbon atoms, straight or branched chain lower alkyl of 1 to 6 carbon atoms substituted by hydroxy or lower alkoxy of 1 to 4 carbon atoms, or R₂ and R₃ are each lower alkyl linked together to form a 5- or 6-membered heterocyclic ring with the amide nitrogen or R₂ and R₃ are each lower alkyl linked together to form a 5- or 6-membered heterocyclic ring with the amide nitrogen and having O as a second heteroatom, and R₄ is hydrogen, lower alkyl of 1 to 4 carbon atoms or phenyl.

4. The compound according to claim 1 which is 2-(α-phenyl-α-hydroxy-acetoxymethyl) - 3 - methyl-carbox-amido-quinoxaline-di-N-oxide-(1,4).

5. The compound according to claim 1 which is:

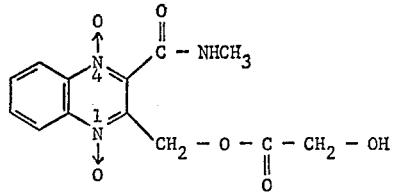

6. The compound according to claim 1 which is:

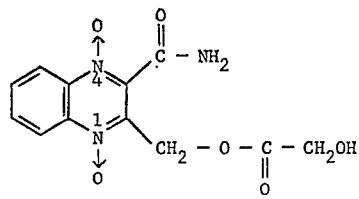

7. The compound according to claim 1 which is:

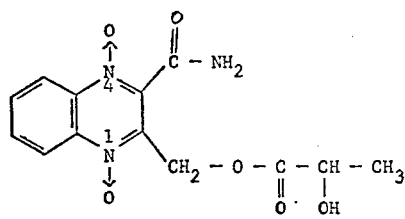

8. A process for the production of a compound of claim 1 which comprises reacting 2-halomethyl-3-carboxylic acid-amido-quinoxaline-di - N - oxide - (1,4) of the formula:

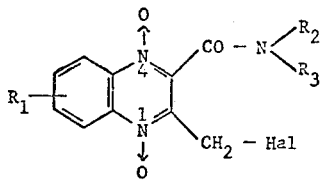

wherein
R₁ is hydrogen, lower alkyl of 1 to 4 carbon atoms, lower alkoxy of 1 to 4 carbon atoms, chlorine or two such moieties,
R₂ is hydrogen, straight or branched chain alkyl of 1 to 12 carbon atoms, cycloalkyl of 5 to 7 carbon atoms, straight or branched chain alkyl of 1 to 12 carbon atoms substituted by hydroxy, lower alkoxy of 1 to 4 carbon atoms, carbalkoxy of 1 to 4 carbon atoms in the alkyl moiety, monoalkylamino of 1 to 4 carbon atoms in the alkyl moiety or dialkylamino of 1 to 4 carbon atoms in each alkyl moiety,
R₃ is hydrogen, straight or branched chain alkyl of 1 to 12 carbon atoms, cycloalkyl of 5 to 7 carbon atoms, straight or branched chain alkyl of 1 to 12 carbon atoms substituted by hydroxy, lower alkoxy of 1 to 4 carbon atoms, carbalkoxy of 1 to 4 carbon atoms in the alkyl moiety, monoalkylamino of 1 to 4 carbon atoms in the alkyl moiety or dialkylamino of 1 to 4 carbon atoms in each alkyl moiety, or R₂ and R₃ are each lower alkyl linked together to form a 5- or 6-membered heterocyclic ring with the nitrogen or R₂ and R₃ are each lower alkyl linked together to form a 5- or 6-membered heterocyclic ring with the amide nitrogen which ring has N or O as a second heteroatom, and
Hal is chlorine or bromine,
with a salt of an α-hydroxy-carboxylic acid of the formula:

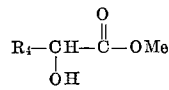

wherein
R₄ is hydrogen, lower alkyl of 1 to 4 carbon atoms or phenyl, and Me is sodium, potassium or ammonium, in an organic solvent at a temperature of from about 10° C. to about 160° C.

References Cited
UNITED STATES PATENTS 3,157,654   11/1964   Sane et al.  _____ 260—250
3,398,141   8/1968   Naddadin et al.  _____ 260—250

NICHOLAS S. RIZZO, Primary Examiner

U.S. Cl. X.R.
424—250